May 17, 1938.  H. KÜPPENBENDER  2,117,428
PHOTOGRAPHIC CAMERA
Filed Oct. 26, 1935   2 Sheets-Sheet 1

Inventor
Heinz Küppenbender
by B. Singer
Attorney

May 17, 1938.   H. KÜPPENBENDER   2,117,428
PHOTOGRAPHIC CAMERA
Filed Oct. 26, 1935   2 Sheets-Sheet 2

Inventor
Heinz Küppenbender
by B. Singer
Attorney

Patented May 17, 1938

2,117,428

UNITED STATES PATENT OFFICE 2,117,428

PHOTOGRAPHIC CAMERA

Heinz Küppenbender, Dresden, Germany, assignor to Zeiss Ikon Aktiengesellschaft, Dresden, Germany Application October 26, 1935, Serial No. 46,839
In Germany October 29, 1934

12 Claims. (Cl. 95—44)

This invention relates to improvements in photographic cameras.

It is an object of the invention to provide in association with a photographic camera a range finder or distance meter which permits to ascertain not only the proper adjustment of the lens to the distance determined by the distance meter but also permits to ascertain whether the depth of sharpness of the image produced by the lens under the aforesaid adjustment will contain the desired portions of the object to be photographed.

It is also an aim of the invention to combine with the adjusting means for the lens, additional means for actuating the distance meter to facilitate the proper adjustment of the lens to the distance of the object, but also determine by a single observation of the image furnished by the distance meter whether the image produced by the lens will have the desired sharpness and depth or not.

It is, therefore, an additional aim of the invention to provide in association with a camera, means for simultaneously setting the distance meter and ascertaining the zone of maximum depth of sharpness for the respective distance.

The invention, furthermore, has the aim of facilitating the adjustment to the proper depth of sharpness by the means through which a diaphragm associated with the lens of the camera is set inasmuch as the diaphragm adjusting means are functionally associated with indicator elements visible through the opening through which the results of the adjustment of the distance meter may be ascertained.

With these and numerous other objects in view, embodiments of the invention are illustrated in the accompanying drawings, to which a reference is made in the following specification:

Figure 3:
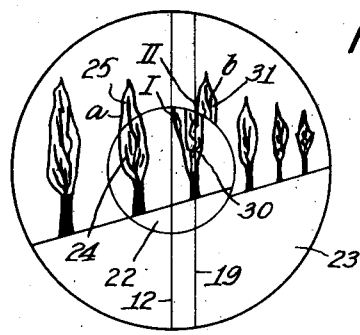
Fig. 3 shows on an enlarged scale images as they appear in the observation opening of the distance meter for this camera.
Figure 6:
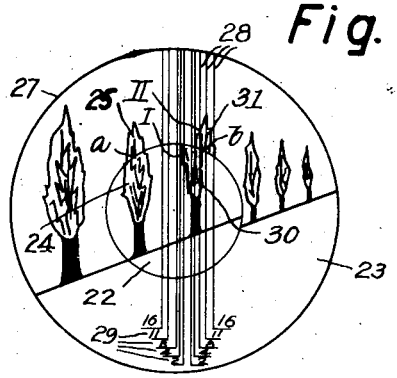

Fig. 6 indicates similar to the showing of Fig. 3, the appearance of images and indicator elements in the observation opening of the distance meter.

The casing 1 of the camera is equipped with a lens mounting 2 which preferably is detachable so as to permit the exchange of one optical equipment for another where the nature or distance of the object to be photographed should require this. This detachable lens mounting also permits axial adjustment of the optical system, as for instance, by means of a screw thread 3 of suitable pitch on one of the elements with a companion thread on another part 4 of the detachable mounting.

In the embodiment illustrated, the camera is, furthermore, equipped with a distance meter of the base type built into the casing of the camera. The front wall of the camera, therefore, has two openings 5 and 6 in alinement respectively with opposite ends of a mirror base 7 in the form of an elongated rhomboid prism. In alinement with one end of this prism, the distance meter is equipped with an observation opening 8 normally closed by a plain glass screen 9. The rotatable part of the lens mounting 2 actuates through a train of gears indicated generally at 10 differentially a pair of wedge-shaped elements 11, and when through the proper actuation of the wedge shaped elements induced by adjustment of the lens mounting, the images which would normally appear offset in the observation opening 8 are placed in registered superimposition, the lens is considered adjusted to the proper distance from the object to be photographed.

The image which the lens would produce upon this adjustment on a sensitized carrier, not shown in the drawings, would have a certain depth sharpness. The portions of the object appearing on the image might be beyond this depth, and therefore, might not be visible on the image with the desired clearness. It is, therefore, of value to ascertain whether the object to be photographed is in certain portions within the depth of sharpness of the lens. The depth of sharpness of the image upon a certain adjustment of the lens is to a large extent controlled by a diaphragm which is associated with the lens. The function of this diaphragm and its adjustment is well known in the art. The diaphragm is usually located in a fixed plane in respect of the axis of the optical equipment, and the aperture of the diaphragm may be enlarged or reduced in accordance with the conditions of the respective exposure.

The cameras also are equipped with means for indicating the aperture values to which the diaphragm can be set. The setting of the diaphragm being of influence for the depth of sharpness of the picture to be produced, it is, therefore, valuable to permit the user of the diaphragm to ascertain simultaneously with the adjustment of the lens also whether the depth of sharpness will be satisfactory for the picture to be made. For this purpose the means for indicating the depth of sharpness are rendered visible, according to the present invention, in the observation opening 8 of the distance meter, said last named part of the equipment indicating the correctness of the axial adjustment of the lens.

Figure 1:
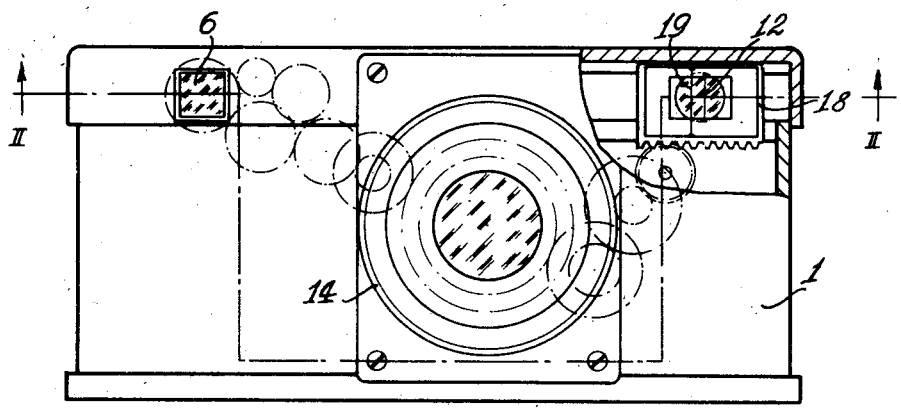
Fig. 1 is a front elevation and fragmentary sectional view of a camera.
Figure 2:
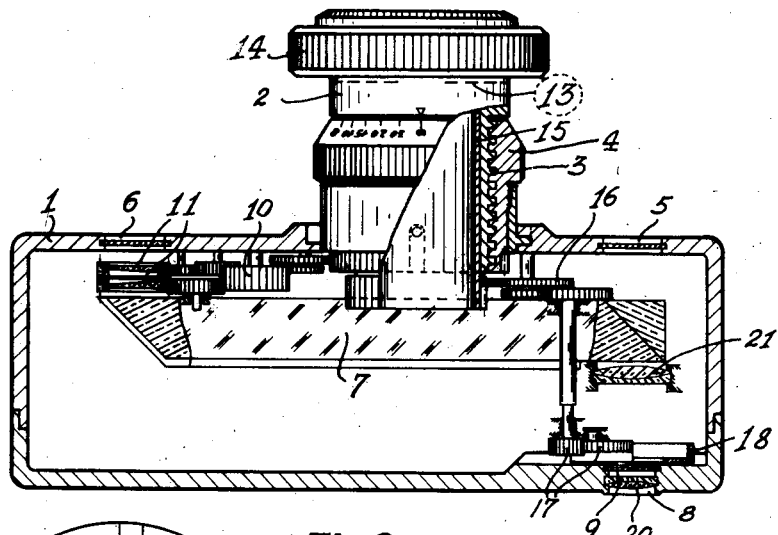
Fig. 2 is a horizontal section of the camera substantially along the broken line II—II of Fig. 1 and looking in the direction of the arrows. A portion of the lens mounting is broken away.

The plate or screen 9 serves as carrier of a linear indicator element 12, Figs. 1 and 3, as for instance, a line marked on the plate 9. In the embodiment of Figs. 1 to 3, the diaphragm 13 may be set to different apertures values upon rotation of the knurled ring 14, and the carrier 15 of the diaphragm actuates upon rotation a gear train indicated generally at 16 and 17. This gear mechanism actuates upon its movement a carrier 18 for a companion indicator element 19, preferably also of linear dimension, and extending preferably parallel to the indicator element 12. The carrier 18 for the second indicator element is shown in the form of a frame suitably guided for rectilinear movement and equipped with a rack bar for engagement with a portion of the gear train 17. It will be obvious, therefore, that upon adjustment of the diaphragm, the linear indicator element 19 will be imparted movement relatively to the companion element 12 of the distance meter. For the purpose of focally adjusting the image produced by the distance meter, and at the same time rendering visible the indicator elements 12, 19 in the same plane of the picture, an optical system in the form of a telescope is interposed in the path of the rays of light of the distance meter and of the indicator elements respectively. This optical equipment comprises an ocular compound lens 20 disposed in the opening 8 for observing the image of the distance meter and an objective lens 21 in the interior of the camera in opposition to one end of the base and in alinement with the opening 5 of the distance meter.

Owing to this arrangement, the user of the camera when holding the observation opening 8 and its compound lens 20 in front of his eye, will be able to observe images of the same object in different area portions of the opening. He will also notice the two linear indicating elements 12 and 19. The proper adjustment of the diaphragm to induce the desired depth of sharpness for the object to be photographed, is indicated to the user when corresponding portions of the object appear in these two images within the two indicator elements visible to him.

In Fig. 3 the two area portions observable by the user of the camera are indicated at 22 and 23 respectively. Assuming that it is desired to photograph sharply the two trees a and b which are located at different distances from the camera. For this purpose the distance meter, which as has been explained in the foregoing is coupled with the rotatable part of the lens system, is focused on the tree a, which is closer to the camera than the tree b. This is accomplished by rotating the part 4 until the two image portions 24 and 25 of the tree a, appearing in the area portions 22 and 23 respectively, are in correct alinement as indicated in Fig. 3. The two image portions 30 and 31 of the tree b, which is arranged farther away from the camera than the tree a, however, are not properly assembled. In order to adjust now the diaphragm 13, the camera is first moved slightly sideways so that the image of the tree b moves toward the center of the image field and until the edge I of the tree b touches the fixed line 12. Then the diaphragm ring 14 is rotated so that the line 19 on the movable carrier 15 moves toward the right a sufficient distance until it touches the edge II of the tree b. When this adjustment is completed both trees a and b are correctly focused to appear with the desired sharpness in the photograph.

While in the embodiment illustrated in Figs. 1 to 3, the linear indicator element 12 is shown as a stationary element while the companion element 19 is movable in accordance with the adjustment of the diaphragm 13, it is obvious that both indicator elements might be functionally associated with the mechanism which is actuated upon adjustment of the diaphragm, whereby for instance, both of these indicator elements may be moved away from each other or towards each other upon the corresponding adjustment of the diaphragm. Whenever the indicator elements are positioned relatively to each other in such manner that selectively determined corresponding portions of the object to be photographed appear to the user of the camera between the two indicator elements, the proper depth of sharpness is accomplished.

Figure 4:
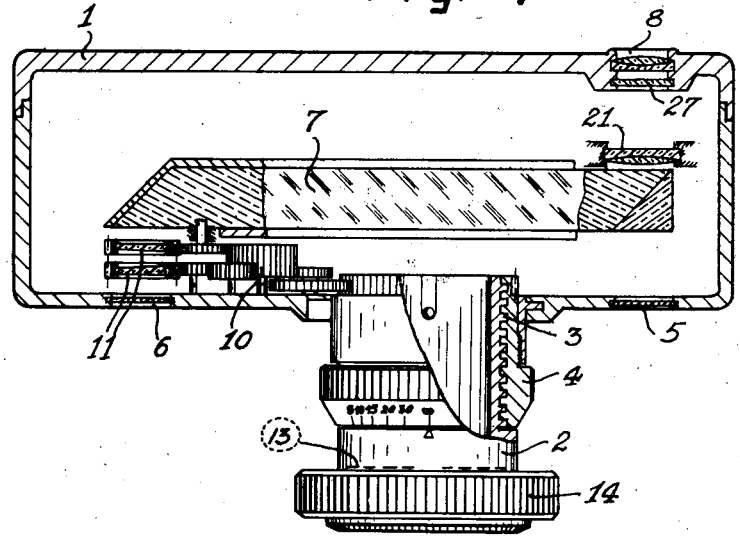
Fig. 4 is a horizontal section of a modification of the camera substantially on the broken line IV—IV of Fig. 5, and looking in the direction of the arrows.
Figure 5:
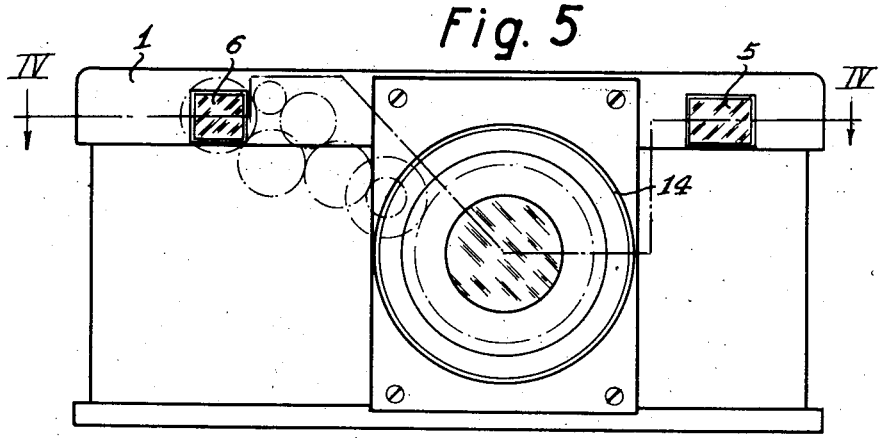
Fig. 5 is a front elevation of the same.

In the embodiment illustrated in Figs. 4 to 6, the corresponding parts have been shown by corresponding reference characters. The proper adjustment of the lens mounting, therefore, also is assured when through said adjustment the train of gears 10 has been actuated to shift relatively the wedge shaped plates 11 until a single image of the object to be photographed appears to the observer in the opening 8.

In this embodiment, however, there is no mechanical connection between the diaphragm adjustment and the linear indicator element or elements as in the first described embodiment. The screen or plate 27 in the observation opening 8 for the distance meter is provided with linear indicator elements in the form of a plurality of pairs of straight lines in symmetrical arrangement, as shown in Fig. 6. The lines 28 of each pair are provided on the plate 27 with markings 29 corresponding to the markings, as employed on diaphragm adjusting mechanisms.

In this embodiment also the observer will see images of the object in different areas 22 and 23, as in the first embodiment. Again the lens system and therewith the distance meter is focused on the tree a which is closer to the camera than the tree b. The correct adjustment of the lens system, as formerly is obtained when the two image portions 24 and 25 of tree a appear correctly assembled in the image field. In order to determine the diaphragm opening which is necessary to let the tree b appear sharply in the photograph, the camera is now moved sideways so that the tree b appears in the image area which is covered with the pairs of lines 28. More specially, the image portion 30 appearing in the inner image area 22 and the image portion 31 of tree b appearing in the outer image area 23 are adjusted in such a way, that the edge I of portion 30 and edge II of portion 31 touch indicating lines of said two pairs of lines 28 which left and right are provided with the same marking. In the example as illustrated by Fig. 6 the edge I of image portion 30 and the edge II of image portion 31 are touching each a line provided with the marking 4, which means that the diaphragm should be adjusted to an opening F:4 in order to obtain a photograph in which both trees *a* and *b* appear with the desired sharpness.

Where exchangeable lens mountings are used in association with a camera, the adjusting mechanism for the movable carrier of the linear indicator element may be provided with compensating means assuring the proper setting of the linear elements for any selected lens mounting. The compensating means also may be attached to the exchangeable lens mounting itself to make certain that with different lens mountings the diaphragms can be adjusted to aperture values which will be ascertained by observation of the suitably spaced linear indicator elements in the device.

I claim:

1. In a camera, the combination with an adjustable lens, of a base distance meter, provided with an opening for observing the two images produced in the same, means operatively connecting said lens with said base distance meter and adapted to cause an adjustment of the distance meter when said lens is adjusted a diaphragm for said lens, means for adjusting said diaphragm to different apertures, and means visible through the observation opening of said base distance meter and provided with spaced indicating marks, at least one mark being provided for each image of said distance meter, said marks when two image portions are correctly matched and when appearing to touch similar points of two other laterally displaced image portions in the distance meter determine the correct diaphragm opening for reproducing the image point corresponding to the displaced image portions and which lies outside the plane for which the base distance meter and therewith the lens is adjusted with sufficient depth of focus in the image produceable by the lens.

2. In a camera, the combination with an adjustable lens, of a base distance meter, the camera having an opening for observing the two images produced in said distance meter, means operatively connecting said lens with said base distance meter and adapted to cause an adjustment of the distance meter when said lens is adjusted, a diaphragm for said lens, means for adjusting said diaphragm to different apertures, and means provided with spaced indicating marks visible through said observation opening of the camera, said indicating marks appearing in the area in which the combined images of the distance meter appear, at least one indicating mark being provided for each image, said marks when two image portions are correctly matched and when appearing to touch similar points of two other laterally displaced image portions in the distance meter determine the correct diaphragm setting for reproducing the image point corresponding to the displaced image portions and which lies outside the plane for which the base distance meter and therewith the lens is adjusted with sufficient depth of focus in the image produceable by the lens.

3. In a camera, the combination with an adjustable lens, of a base distance meter, the camera having an opening for observing the two images produced in said distance meter, means operatively connecting said lens with said base distance meter and adapted to cause an adjustment of the distance meter when said lens is adjusted, a diaphragm for said lens, means for adjusting said diaphragm to different apertures, and means provided with spaced indicating marks visible through said observation opening of the camera, said indicating marks appearing in the area in which the combined images of the distance meter appear, and comprising two similar series of spaced vertical lines, one series for each image, one series of said lines being arranged in the right half and the other series of said lines being arranged in the left half of said area, similar lines in each series when two image portions are correctly matched and when appearing to touch similar image points of two other laterally displaced image portions in the distance meter indicate the required diaphragm aperture for reproducing the image point corresponding to the displaced image portions and which lies outside the plane for which the base distance meter and therewith the lens is adjusted with sufficient depth of focus in the image produceable by the lens.

4. In a camera, the combination with an adjustable lens, of a base distance meter, the camera having an opening for observing the two images produced in said distance meter, means operatively connecting said lens with said base distance meter and adapted to cause an adjustment of the distance meter when said lens is adjusted, a diaphragm for said lens, means for adjusting said diaphragm to different apertures, and means operatively connected with said diaphragm adjusting means and provided with spaced indicating marks visible through said observation opening of the camera, said indicating marks appearing in the area in which the combined images of the distance meter appear, said indicating marks comprising two spaced vertical lines, the distance at which said lines are spaced apart indicate the widest allowable relative displacement of the two images in the distance meter at which for a predetermined diaphragm aperture a sufficient depth of focus of the picture produceable by the lens will be obtained.

5. In a camera, the combination with an adjustable lens, of a base distance meter, the camera having an opening for observing the two images produced in said distance meter, means operatively connecting said lens with said base distance meter and adapted to cause an adjustment of the distance meter when said lens is adjusted, a diaphragm for said lens, means for adjusting said diaphragm to different apertures, and means provided with spaced indicating marks visible through said observation opening of the camera, said indicating marks comprising two spaced vertical lines which appear in the area in which the combined images of the distance meter appear, the distance at which said lines are spaced apart indicate the widest allowable relative displacement of the two images in the distance meter at which for a predetermined diaphragm aperture a sufficient depth of focus of the picture produceable by the lens will be obtained, one of said lines being stationary and the other of said lines being arranged on a movable member for varying the horizontal distance between said lines, means for adjusting said movable member, and means for operatively connecting said movable member adjusting means with said diaphragm adjusting means, whereby the position of said movable line is varied whenever the diaphragm aperture is varied.

6. In a camera, the combination with an adjustable lens, of a base distance meter, the camera having an opening for observing the two images produced in said distance meter, means operatively connecting said lens with said base distance meter and adapted to cause an adjustment of the distance meter when said lens is adjusted, a diaphragm for said lens, means for adjusting said diaphragm to different apertures, and means provided with spaced indicating marks visible through said observation opening of the camera, said indicating marks comprising two spaced vertical lines, adapted to be adjusted relatively to each other to vary the distance between the same, said vertical lines appearing in the area in which the combined images of the distance meter appear, said lines when two image portions are correctly matched and when appearing to touch similar points of two other laterally displaced image portions in the distance meter indicate the correct diaphragm aperture for producing the image point corresponding to the displaced image portions and which lies outside the plane for which the base distance meter and therewith the lens is adjusted with sufficient depth of focus in the image produceable by the lens.

7. In a camera, the combination with an adjustable lens, of a base distance meter, the camera having an opening for observing the two images produced in said distance meter, means operatively connecting said lens with said base distance meter and adapted to cause an adjustment of the distance meter when said lens is adjusted, a diaphragm for said lens, means for adjusting said diaphragm to different apertures, and means provided with spaced indicating marks visible through said observation opening of the camera, said indicating marks appearing in the area in which the combined images of the distance meter appear, said indicating marks comprising two spaced vertical lines adapted to be adjusted relatively to each other to vary the distance between the same, said lines when two image portions are correctly matched and when appearing to touch similar points of two other laterally displaced image portions in the distance meter indicate the correct diaphragm aperture for producing the image point corresponding to the displaced image portions and which lies outside the plane for which the base distance meter and therewith the lens is adjusted with sufficient depth of focus in the image produceable by the lens, means for varying the distance between said vertical lines, said means being coupled with said diaphragm adjusting means, whereby the distance of said lines is varied whenever the diaphragm aperture is varied.

8. In a camera, the combination with an adjustable lens, of a base distance meter, the camera having an opening for observing the two images produced in said distance meter, means operatively connecting said lens with said base distance meter and adapted to cause an adjustment of the distance meter when said lens is adjusted, a diaphragm for said lens, means for adjusting said diaphragm to different apertures, and means provided with spaced indicating marks visible through said observation opening of the camera, said indicating marks comprising two spaced vertical lines adapted to be adjusted relatively to each other to vary the distance between the same, said vertical lines appearing in the area in which the combined images of the distance meter appear, said lines when two image portions are correctly matched and when appearing to touch similar image points of two other laterally displaced image portions in the distance meter indicate the correct diaphragm aperture for producing the image point corresponding to the displaced image portions and which lies outside the plane for which the base distance meter and therewith the lens is adjusted with sufficient depth of focus in the image produceable by the lens, one of said lines being stationary and the other of said lines being arranged on a movable member for varying the horizontal distance between said lines, means for adjusting said movable member, and means for operatively connecting said movable member adjusting means with said diaphragm adjusting means, whereby the position of said movable line is varied whenever the diaphragm aperture is varied.

9. In a camera, the combination with an adjustable lens, of a base distance meter, the camera having an opening for observing the two images produced in said distance meter and adapted to cause an adjustment of the distance meter when said lens is adjusted, a diaphragm for said lens, means for adjusting said diaphragm to different apertures, and a transparent plate provided with spaced indicating marks arranged in line with said observation opening of the camera so that said indicating marks appearing in the area in which the combined images of the distance meter appear, said indicating marks comprising two series of similarly spaced vertical lines arranged on said plate symmetrically on opposite sides of its vertical median line, each pair of coordinated lines of said two series of lines indicating a predetermined diaphragm aperture and when appearing to touch similar points in laterally displaced image portions in the distance meter upon correctly matching other image portions assure a sufficient depth of focus of the image produceable by the lens when the diaphragm aperture is adjusted to the size indicated by said pair of lines.

10. In a camera, the combination of a selectively exchangeable lens system, an adjustable diaphragm associated with said lens system, a base distance meter, means for simultaneously adjusting said lens system and said base distance meter, said last named adjusting means being releasably coupled with said base distance meter and being exchangeable with said lens system, compensating means on said exchangeable lens system for coordinating the base distance meter with the lens system, the camera having an opening for observing the two images produced by the distance meter, and means provided with spaced indicating marks visible through said observation opening of the camera, said indicating marks appearing in the area in which the combined images of the distance meter appear, at least one indicating mark being provided for each image, said marks when two image portions are correctly matched and when appearing to touch similar points of two other laterally displaced image portions in the distance meter determine the correct diaphragm setting for reproducing the image point corresponding to the displaced image portions and which lies outside the plane for which the base distance meter and therewith the lens is adjusted with sufficient depth of focus in the image produceable by the lens.

11. In a camera, the combination of a lens, means for axially adjusting the lens relatively to the camera, a base distance meter, means connected with the lens adjusting means for adjusting the distance meter to varying distances, a diaphragm associated with the lens, means for setting the diaphragm to varying aperture values to determine thereby the depth of focus of the image produceable by the lens, the camera having an observation opening for the distance meter, a member having a vertical indicator line placed in said opening, a carrier provided with a vertical linear indicator arranged adjacent said member, means for adjusting said carrier horizontally and relatively to said indicating line on said member, said carrier adjusting means being operatively connected with the diaphragm setting means, said indicating line on the member and indicator on the carrier, when upon matching two image portions appearing to touch similar points of two other laterally displaced image portions in the distance meter indicate the diaphragm has been adjusted to reproduce the image point corresponding to the displaced image portions and which lies outside the plane for which the base distance meter and therewith the lens is adjusted with sufficient depth of focus in the picture produceable by the lens.

12. In a camera, the combination of a lens, means for axially adjusting the lens relatively to the camera, a base distance meter, means connected with the lens adjusting means for adjusting the distance meter to varying distances, a diaphragm associated with the lens, means for setting the diaphragm to varying aperture values to determine thereby the depth of focus of the image produceable by the lens, the camera having an observation opening for the distance meter, a screen having a vertical indicator line placed in said opening, a carrier provided with a vertical linear indicator arranged adjacent said screen, means for adjusting said carrier horizontally in a plane parallel to said screen and relatively to the indicating line on the latter, said carrier adjusting means being operatively connected with said diaphragm setting means, a telescope in alinement with said observation opening and adapted to project the combined images of the distance meter upon the screen, said indicating line on the screen and indicator on the carrier, when upon correctly matching two image portions appearing to touch similar points of two other laterally displaced image portions in the distance meter indicate that the diaphragm has been adjusted to reproduce the picture point corresponding to the displaced image portions and which lies outside the plane for which the base distance meter and therewith the lens is adjusted with sufficient depth of focus in the picture produceable by the lens.

HEINZ KÜPPENBENDER.